United States Patent

Mirsky et al.

[11] Patent Number: 5,622,042
[45] Date of Patent: Apr. 22, 1997

[54] METHOD FOR PREDICTING AND USING THE EXHAUST GAS TEMPERATURES FOR CONTROL OF TWO AND THREE SHAFT GAS TURBINES

[75] Inventors: Saul Mirsky; Naum Staroselsky, both of West Des Moines, Iowa

[73] Assignee: Compressor Controls Corporation, Des Moines, Iowa

[21] Appl. No.: 395,599

[22] Filed: Feb. 27, 1995

[51] Int. Cl.[6] .................................................. F02C 9/28
[52] U.S. Cl. ................................. 60/39.03; 60/39.281
[58] Field of Search ........................... 60/39.03, 39.281, 60/243

[56] References Cited

U.S. PATENT DOCUMENTS

| | | |
|---|---|---|
| 2,809,492 | 10/1957 | Arkawy . |
| 3,377,848 | 4/1968 | Marvin . |
| 3,379,584 | 4/1968 | Bean et al. . |
| 3,667,218 | 6/1972 | Davis ................................. 60/39.281 |
| 3,789,665 | 2/1974 | Hohenberg . |
| 3,902,315 | 9/1975 | Martin ................................. 60/39.281 |
| 3,956,883 | 5/1976 | Anderson et al. . |
| 4,055,997 | 11/1977 | Kniat . |
| 4,117,670 | 10/1978 | Dombkowsi ................. 60/39.281 |
| 4,307,451 | 12/1981 | Zagranski et al. . |
| 4,350,008 | 9/1982 | Zickwolf ................. 60/39.281 |
| 4,627,234 | 12/1986 | Schuh ................. 60/39.281 |
| 4,748,804 | 6/1988 | Krukoski . |
| 5,212,943 | 5/1993 | Harris . |

FOREIGN PATENT DOCUMENTS

| | | |
|---|---|---|
| 649606 | 5/1985 | Switzerland . |
| 2011091 | 10/1978 | United Kingdom . |

*Primary Examiner*—Louis J. Casaregola
*Attorney, Agent, or Firm*—Henderson & Sturm

[57] ABSTRACT

A method and apparatus are disclosed for protecting gas turbines (two- and three-shaft) from damage or destruction during dangerous transients. In this situation, fuel flow must be reduced, as needed, to keep the exhaust gas temperature below a maximum limit, thereby avoiding damage to blading in the turbine's first-stage. The dynamic action of the temperature downstream of the combustion chamber may be estimated and then used to correct the temperature measured by thermocouples. For this approach, the turbine is instrumented with an inlet pressure transmitter and an outlet temperature transmitter. The method dynamically estimates temperatures downstream of the combustion chamber and reduces the fuel flow rate if the estimated temperature approaches the temperature limit. Existing thermocouple measurements (EGT) are used as well as the pressure of air exiting the compressor (CDP) upstream of the combustion chamber. By employing a first-order lag and a steady-state gain, the measured CDP is used to predict a "correction" EGT signal which is then added to the measured EGT, resulting in a corrected EGT. Once the corrected EGT has been calculated, its first time-derivative is used to adjust the safety margin between a maximum allowable limit temperature and a lower predetermined temperature set point.

6 Claims, 1 Drawing Sheet

5,622,042

METHOD FOR PREDICTING AND USING THE EXHAUST GAS TEMPERATURES FOR CONTROL OF TWO AND THREE SHAFT GAS TURBINES

TECHNICAL FIELD

This invention relates generally to a control method and apparatus for protecting gas turbines (two- and three-shaft) from damage or destruction during dangerous transients, by dynamically estimating temperatures downstream of the combustion chamber, and by reducing the fuel flow rate if the estimated temperature approaches the temperature limit.

BACKGROUND ART

In a gas turbine the most critical temperature is located just downstream of the combustion chamber where excessive temperatures can result in damage or destruction of first-stage turbine blades. Therefore, temperatures must be limited by reducing the amount of fuel entering the combustor if the temperature becomes dangerously high. Because of nonuniform distribution of the temperature-field downstream of the combustion chamber, measurement in this region is not, in general, an accurate measure of blade temperature at the inlet to the first-stage. In addition, it is difficult to have a high-speed temperature measurement near the upstream region of the first-stage inlet. This is mainly due to practicality reasons of tight volume configurations and inaccessibility near the combustion chamber sections to the first-stage inlet. Also, because of an unfriendly environment, the thermocouple transducers require shielding and protective thermowells which affect transducer response time and accuracy.

The present control strategy makes use of readings downstream of the gas generator turbine, where measurement is more reliable because of lower temperatures. Based on rules of thumb, testing, and empirical correlation, the exhaust temperature value at which blade damage is reached is tabulated for different operating conditions of the gas turbine. Typically, the exhaust temperature limiting value is tabulated as a function of air compressor discharge pressure (CDP). In the fuel control system a safety margin is defined to keep the exhaust temperature safely below the exhaust temperature limiting value specified for a given load on the gas turbine.

As a result of the preceding compounding factors, the safety margin defined in the fuel control system (to keep the exhaust temperature at a safe value in order to prevent blade damage) is very conservative. This results in driver limitations leading to production losses, and the inability to operate the gas turbine at higher first-stage inlet temperatures for higher operating efficiency. For the above reasons, there is a need to accurately control and regulate fuel intake during dangerous transients for two- and three-shaft gas turbines.

DISCLOSURE OF THE INVENTION

The purpose of this invention is to estimate the dynamic action of the temperature downstream of the combustion chamber of a gas turbine. This dynamic action will then be used to correct the temperatures measured by existing thermocouples. The estimate is based on the pressure of the air exiting the compressor upstream of the combustion chamber, referred to as compressor discharge pressure (CDP). The CDP or NHP will be processed through a lead-lag element which results in a corrected exhaust gas temperature ($EGT_{CORRECTED}$) used by the control system to restrict fuel flow during dangerous transients.

Current fuel control methods often fail to reliably measure the temperature at the most critical location—upstream of the turbine's first-stage and downstream of the combustor. Not only is this temperature difficult to measure, but it is rare to have a temperature measurement in this severe environment for turbines used in industrial applications.

An advantage of the present invention is that it uses existing thermocouples, but is less affected by inherent time lags of the signal inputs. Additionally, this new control method uses the pressure of air exiting the compressor (CDP).

This invention also offers considerable economic advantages by its method for reducing both process upset and turbine damage. Additional spin-off benefits would better ensure efficient operation, extend the intervals between scheduled shutdowns, and increase monetary savings.

BEST MODE FOR CARRYING OUT THE INVENTION

Figure 1:
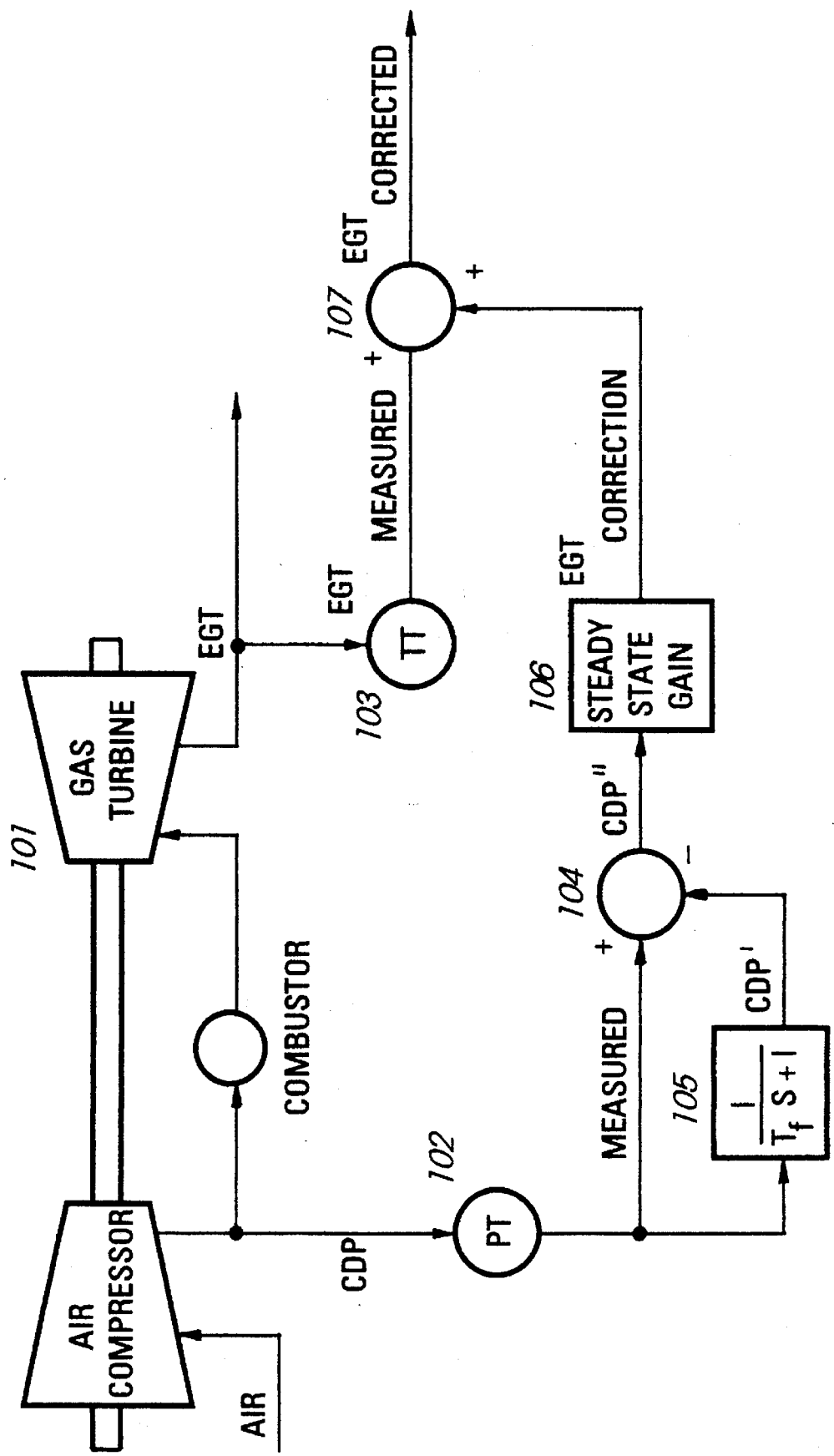
FIG. 1 shows a block diagram of the proposed control method.

To protect a process from unnecessary disruption, and to prevent damage or destruction of gas turbines (two- and three-shaft), fuel intake must not only be easily and accurately controlled, it must be restricted during dangerous transients, thereby avoiding damage to blading in the turbine's first-stage. During this operation a fuel controller reduces fuel flow as needed to keep the exhaust gas temperature (EGT) below a maximum limit that is a function of compressor discharge pressure (CDP).

The control method for this invention dynamically estimates the temperature downstream of the combustor by using measurements from existing thermocouples, and by using either the pressure of the air exiting the compressor (CDP) upstream of the combustor. These temperature and pressure or speed measurements are then analyzed, resulting in a corrected EGT used by the control system. Once the corrected EGT has been calculated, its first time-derivative is used to adjust the safety margin between a maximum allowable limit temperature and a lower predetermined temperature set point.

FIG. 1 depicts a block diagram of the proposed control method for a gas turbine 101 where CDP is sensed by a pressure transmitter 102 and EGT is sensed by a temperature transmitter 103. The measured EGT signal is transmitted to a summing operation 107, whereas the measured CDP signal is transmitted simultaneously to a summing operation 104 (fast dynamics) and to a first-order lag 105 which is represented by a transfer function, $$\frac{1}{T_f s + 1}$$

where:

$T_f$=time constant s=Laplace transform variable

Note that the first-order lag could be selected to match the dynamics between $CDP_{MEASURED}$ and $EGT_{MEASURED}$, and could be substituted by a higher-order transfer function with a pure time-delay element. CDP' is subtracted from $CDP_{MEASURED}$, and the difference, CDP'' (fast dynamics of CDP), is multiplied by a steady-state gain $$\left[\frac{d(EGT)}{d(CDP)}\right]$$

106 to predict $EGT_{CORRECTION}$. The steady-state gain is calculated at the time of installation and is characterized as a function of gas generator speed (NGG, two-shaft), or high-pressure rotor speed (NHP, three-shaft). $EGT_{CORRECTION}$ is then added to $EGT_{MEASURED}$, thereby calculating $EGT_{CORRECTED}$.

The safety margin can now be adjusted, based on the first time-derivative of $EGT_{CORRECTED}$. The EGT limit constraint is established by choosing a temperature set point at a temperature that is less than the allowable limit (initial margin of safety). Next, the corrected EGT is calculated and from its derivative value, the safety margin between the maximum allowable limit temperature and the chosen temperature set point is adjusted. This instantaneous margin of safety is derived from $$SM^* = SM + \frac{c}{2}\left[\frac{d}{dt}(EGT_{CORRECTED}) + \left|\frac{d}{dt}(EGT_{CORRECTED})\right|\right] = SM + DR$$

where:
SM*=instantaneous margin of safety
SM=initial margin of safety
DR=derivative response contribution to the safety margin
C=constant Obviously many modifications and variations of the present invention are possible in light of the above teachings. It is, therefore, to be understood that within the scope of the appended claims, the invention may be practiced otherwise than as specifically described.

We claim:

1. A method of controlling a gas turbine with an exhaust gas temperature limit constraint comprising an air compressor, a combustor, and a gas generator or a high-pressure turbine, the method comprising the steps of:

(a) choosing a temperature set point at a temperature less than a maximum allowable limit;

(b) calculating a corrected exhaust gas temperature;

(c) adjusting a safety margin between the maximum allowable limit temperature and the chosen temperature set point, based on a first time-derivative of the corrected exhaust gas temperature; and (d) changing the exhaust gas temperature in a direction toward the temperature set point if the corrected exhaust gas temperature is greater than the temperature set point.

2. A method of claim 1 wherein the step of calculating a corrected exhaust gas temperature comprises the steps of:

(a) determining the gas turbine's exhaust gas temperature; and (b) calculating a corrected exhaust gas temperature.

3. The method of claim 1 wherein the step of calculating a corrected exhaust gas temperature comprises the steps of:

(a) determining the air compressor's discharge pressure;

(b) calculating a steady-state gain as a function of compressor discharge pressure and exhaust gas temperature;

(c) extracting fast dynamics from the compressor's discharge pressure signal by using a higher frequency rate than that contained in the temperature signal;

(d) multiplying the fast dynamics of the compressor discharge pressure by the steady-state gain to predict the fast dynamics of the exhaust gas temperature; and (e) adding the predicted fast dynamics of the exhaust gas temperature to the measured exhaust gas temperature to calculate the corrected exhaust gas temperature.

4. The method of claim 3 wherein the step of extracting fast dynamics from the compressor's discharge pressure signal comprises the steps of:

(a) passing the compressor's discharge pressure signal through a lead-lag element, which represents the effects of the turbine and a measurement system on the exhaust gas temperature; and (b) subtracting a first-order lag from the measured pressure signal to determine the fast dynamics.

5. The method of claim 1 wherein the step of adjusting a safety margin comprises the steps of:

(a) sensing changing exhaust gas temperature conditions;

(b) calculating the time-derivative of the corrected exhaust gas temperature;

(c) generating a signal proportional to the first time-derivative; and (d) adjusting the safety margin in response to a positive derivative.

6. The method of claim 2 also comprising the steps of:

(a) reducing the safety margin to a minimum, based on a ramp rate;

(b) maintaining the safety margin within control limits; and (c) modulating a fuel flow in response to the value of the corrected exhaust gas temperature.

* * * * *